United States Patent
Yang

(10) Patent No.: US 10,861,074 B2
(45) Date of Patent: Dec. 8, 2020

(54) FURNITURE ORDERING AND MARKETING SYSTEM AND METHOD THEREOF

(71) Applicant: Lei Yang, City of Industry, CA (US)

(72) Inventor: Lei Yang, City of Industry, CA (US)

(73) Assignee: Furniture of America, Inc., City of Industry, CA (US)

( * ) Notice: Subject to any disclaimer, the term of this patent is extended or adjusted under 35 U.S.C. 154(b) by 546 days.

(21) Appl. No.: 15/588,686

(22) Filed: May 7, 2017

(65) Prior Publication Data

US 2018/0322548 A1    Nov. 8, 2018

(51) Int. Cl.
G06Q 10/08    (2012.01)
G06Q 30/06    (2012.01)
G06Q 30/02    (2012.01)
G06Q 50/00    (2012.01)

(52) U.S. Cl.
CPC ....... *G06Q 30/0617* (2013.01); *G06Q 10/083* (2013.01); *G06Q 10/087* (2013.01); *G06Q 30/0283* (2013.01); *G06Q 30/0603* (2013.01); *G06Q 30/0641* (2013.01); *G06Q 30/0601* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 7,739,308 B2 * | 6/2010 | Baffier | ...................... | G06F 8/61 707/802 |
| 8,225,198 B2 * | 7/2012 | Hanechak | ........... | G06F 16/9577 715/243 |
| 9,489,349 B2 * | 11/2016 | Ying | ...................... | G06F 40/186 |
| 9,558,288 B1 * | 1/2017 | Boswell | .............. | G06F 21/6227 |
| 9,792,380 B2 * | 10/2017 | Matheny | ............. | G06F 16/9558 |
| 2004/0044588 A1 * | 3/2004 | Smith | ..................... | G06Q 30/02 705/26.7 |
| 2004/0111337 A1 * | 6/2004 | Feeney | ................ | G06Q 10/087 705/28 |
| 2006/0004769 A1 * | 1/2006 | Fleming | ................. | G06Q 30/02 |
| 2006/0053080 A1 * | 3/2006 | Edmonson | ............. | G06Q 30/06 705/59 |

(Continued)

OTHER PUBLICATIONS

Weiss, T.R., "Failed online retail site revived as Web portal; Furniture.com acts as middleman via links to brick-and-mortar IT systems," Computerworld, 39.48: 10(1), Nov. 28, 2005 (Year: 2005).*

(Continued)

*Primary Examiner* — Nicholas D Rosen
(74) *Attorney, Agent, or Firm* — Raymond Y. Chan; David and Raymond Patent Firm

(57) ABSTRACT

A furniture ordering and marketing method includes the steps of providing furniture products in a uniform warehouse; under control of a service system, providing a templated website displaying furniture products information, identifying a distributor in response to a log request from the distributor via a client system, converting the templated website into an individual website with the distributor's individual information, processing an placed order sent from the individual website, and shipping ordered furniture products from the uniform warehouse to a shipping address on the placed order.

36 Claims, 11 Drawing Sheets

(56) References Cited

U.S. PATENT DOCUMENTS

| | | | | |
|---|---|---|---|---|
| 2008/0027829 | A1* | 1/2008 | Morrow | G06Q 30/02 |
| | | | | 705/26.1 |
| 2008/0096594 | A1* | 4/2008 | Vinding | H04L 51/38 |
| | | | | 455/466 |
| 2008/0306883 | A1* | 12/2008 | Baffier | G06F 8/61 |
| | | | | 705/400 |
| 2009/0249193 | A1* | 10/2009 | Hanechak | G06F 16/986 |
| | | | | 715/235 |
| 2012/0166261 | A1* | 6/2012 | Velusamy | G06Q 30/0214 |
| | | | | 705/14.16 |
| 2014/0180874 | A1* | 6/2014 | Zhao | G06Q 30/0643 |
| | | | | 705/26.61 |
| 2015/0019958 | A1* | 1/2015 | Ying | G06F 40/103 |
| | | | | 715/243 |
| 2015/0066597 | A1* | 3/2015 | Givoni | G06Q 10/0637 |
| | | | | 705/7.36 |
| 2015/0346917 | A1* | 12/2015 | Matheny | G06F 16/958 |
| | | | | 715/835 |

OTHER PUBLICATIONS

Anon., "Epsom Skin Clinic Recently Buys Fino Gloss White Tall 4 Door Display Cabinet from FurnitureInFashion," PRWeb Newswire, Sep. 11, 2013 (Year: 2013).*

* cited by examiner

MY DASHBOARD — 22

Hello, demo demo!

From your My Account Dashboard you have the ability to view a snapshot of your recent account activity and update your account information. Select a link below to view or edit information.

RECENT ORDERS — 3171a                                         View All

| ORDER # | DATE | SHIP TO | ORDER TOTAL | STATUS | |
|---|---|---|---|---|---|
| 100009270 | 2/24/2017 | demo-first demo-last | $793.00 | Canceled | View Order |
| 100003807 | 4/27/2016 | demo demo | $893.00 | Canceled | View Order \| Reorder |

FIG.6

EDIT ACCOUNT INFORMATION — 23

ACCOUNT INFORMATION

Account Number : DEMO ACCT

FIRST NAME *          LAST NAME *
demo                  demo

EMAIL ADDRESS *
demo@foagroup.com

☐ CHANGE PASSWORD
                                       SAVE
<< Go back
                                   * Required Fields

FIG.7

CUSTOMER SERVICE FORM — 26

CHOOSE CATEGORY *
- ○ General Inquiry or Feedback
- ○ Payment
- ○ Shipping/Delivery Inquiry
- ○ Return/Exchange/Parts Request

ACCOUNT NUMBER
`DEMO ACCT`

COMPANY *
`Happy Family furniture Enterprise`

FIRST NAME *
`demo`

LAST NAME *
`demo`

CITY *
`Los Angeles`

STATE *
`California`

PHONE *
`123-123-1234`

FAX

EMAIL
`demo@foagroup.com`

COMMENT *

SIGNATURE *

[ CLEAR SIGNATURE ]

* Required Fields

[ SUBMIT ]

FIG.10

PARTS / RETURN FORM —27

- NO CREDIT IS ISSUED PRIOR TO FULL INSPECTION BY OUR CUSTOMER SERVICE DEPARTMENT.
- 30-DAY RETURN / EXCHANGE POLICY FROM ORIGINAL INVOICE DATE. NO EXCEPTION. (60-DAY FOR PARTS REQUEST)
- RESTOCKING FEE WILL APPLY TO ALL RETURNS. NO CASH REFUND. CREDIT ONLY.
- ORIGINAL INVOICE IS REQUIRED FOR ALL RETURNS, EXCHANGES OR PARTS REQUESTS.
- NO RETURN ON ALL MATTRESSES & UPHOLSTERIES (INCL. SOFA, LOVE SEAT, CHAIR, SECTIONAL, ETC.)

CHOOSE CATEGORY *
○ Parts Request
○ Exchange
○ Return for Credit

FIG.11

MSRP MODE —28

☐ ENABLE MSRP —3175a
By enabling MSRP mode, I agree that I bear all risks associated with the use of this system. I understand that MSRP mode is still under development and may contain errors, and I will not hold Furniture of America responsible or liable, directly or indirectly, for any damage or loss caused or alleged to be caused by or in connection with my use of this system.

☐ SHOW IN-STOCK ITEMS ONLY —3176a

SELECT YOUR MARKUP —3177a
○ 100% (Double of your cost)
○ 125%
○ 150%
○ 175%
○ 200% (Triple of your cost)
○ Other ☐%

SAVE

FIG.12

FURNITURE ORDERING AND MARKETING SYSTEM AND METHOD THEREOF

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an ordering and marketing system and method therefor, and more particularly to a system and method for marketing furniture products of a uniform warehouse and placing and accepting orders of such furniture products by one or more distributors of the uniform warehouse via a communication network.

Description of Related Arts

The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request. The request is forwarded to the Web server that supports that Web page. When that Web server receives the request, it sends that Web page to the client computer system.

Generally, a uniform warehouse of furniture products could be a manufacturer or importer of furniture which stores the furniture products in one or more warehouses in a nation. One or more distributors such as furniture retail stores located all over the nation of the uniform warehouse provide hard copy catalogues or electronic catalogues to their local customers for furniture shopping. The interstate distributor will place an order to the uniform warehouse through telephone, email, or fax, or log into the website of the uniform warehouse to place an order for its customer and the ordered furniture(s) will be shipped to either the distributor for delivery or the customer directly. Alternatively, distributors which are located close to the uniform warehouse will send trucks to the uniform warehouse to pick up the ordered furniture and deliver to its customers.

Other furniture warehouses, such as IKEA, open their warehouses with showrooms to public that consumers may visit such public furniture warehouse to shop in the showroom, pick up the purchased furniture from the warehouse and deliver back home by the consumer's own truck or pick up vehicle. Although a public furniture warehouse cuts the distributors out and deals with the furniture consumers directly so as to save the distribution cost, it requires multiple relatively big warehouses available all over the nation in order to provide shopping opportunities for all nationwide consumers, which that may also increase the management difficulty and cost and limit the marketing ability thereof.

In view of above, both the conventional marketing and ordering systems and methods for furniture are not efficient and cost effective and thus a novel marketing and order system and method becomes an urgent demand in the furniture industry.

SUMMARY OF THE PRESENT INVENTION

The invention is advantageous in that it provides a furniture ordering and marketing system and method therefor, which provides a templated website and an individual website, for ease of the distributors in other states or countries can show to their store customers or online customers of furniture products on the templated website.

Another advantage of the invention is to provide a furniture ordering and marketing system and method therefor, wherein the templated website enables distributors to use the information and layout of the templated website to convert into their own individual websites with their own logos.

Another advantage of the invention is to provide a furniture ordering and marketing system and method therefor, which the distributors are able to markup or reprice the retail prices of the products shown in the converted individual website.

Another advantage of the invention is to provide a furniture ordering and marketing system and method therefor, which provides a MSRP mode and the distributors are able to markup or reprice the retail prices of the products shown in the converted individual website in the MSRP mode of the individual website.

Another advantage of the invention is to provide a furniture ordering and marketing system and method therefor, the MSRP mode increases sales at distributor's store.

Another advantage of the invention is to provide a furniture ordering and marketing system and method therefor, which provides a sale catalog and the distributors are able to markup or reprice the furniture products prices on the sale catalog.

Another advantage of the invention is to provide a furniture ordering and marketing system and method therefor, furniture products which are stored in a uniform warehouse can be shipped to consumers who pick up to purchase the furniture products on the templated website and the individual website of the distributor.

Additional advantages and features of the invention will become apparent from the description which follows, and may be realized by means of the instrumentalities and combinations particularly point out in the appended claims.

According to the present invention, the foregoing and other objects and advantages are attained by a furniture ordering and marketing method, comprising the steps of:

(A) providing furniture products in a uniform warehouse;

(B) under control of a service system, providing a templated website displaying furniture products information;

(C) identifying a distributor in response to a log request from the distributor via a client system;

(D) converting the templated website into an individual website with the distributor's individual information;

(E) processing a placed order sent from the individual website; and (F) shipping ordered furniture products from the uniform warehouse to a shipping address on the placed order.

According to the present invention, the foregoing and other objects and advantages are also attained by a furniture ordering and marketing system, comprising a service system and a client system communicatingly connected with the service system, wherein the service system provides information of furniture products which are stored in a warehouse and sends Web pages of the furniture products information to the client system, wherein the service system comprises a converting module which converts a templated website into an individual website having individual information.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 5 to FIG. 12 illustrate Web pages of an individual website of the furniture ordering and marketing system according to above embodiment of the present invention.

DETAILED DESCRIPTION OF THE PREFERRED EMBODIMENT

Figure 1:
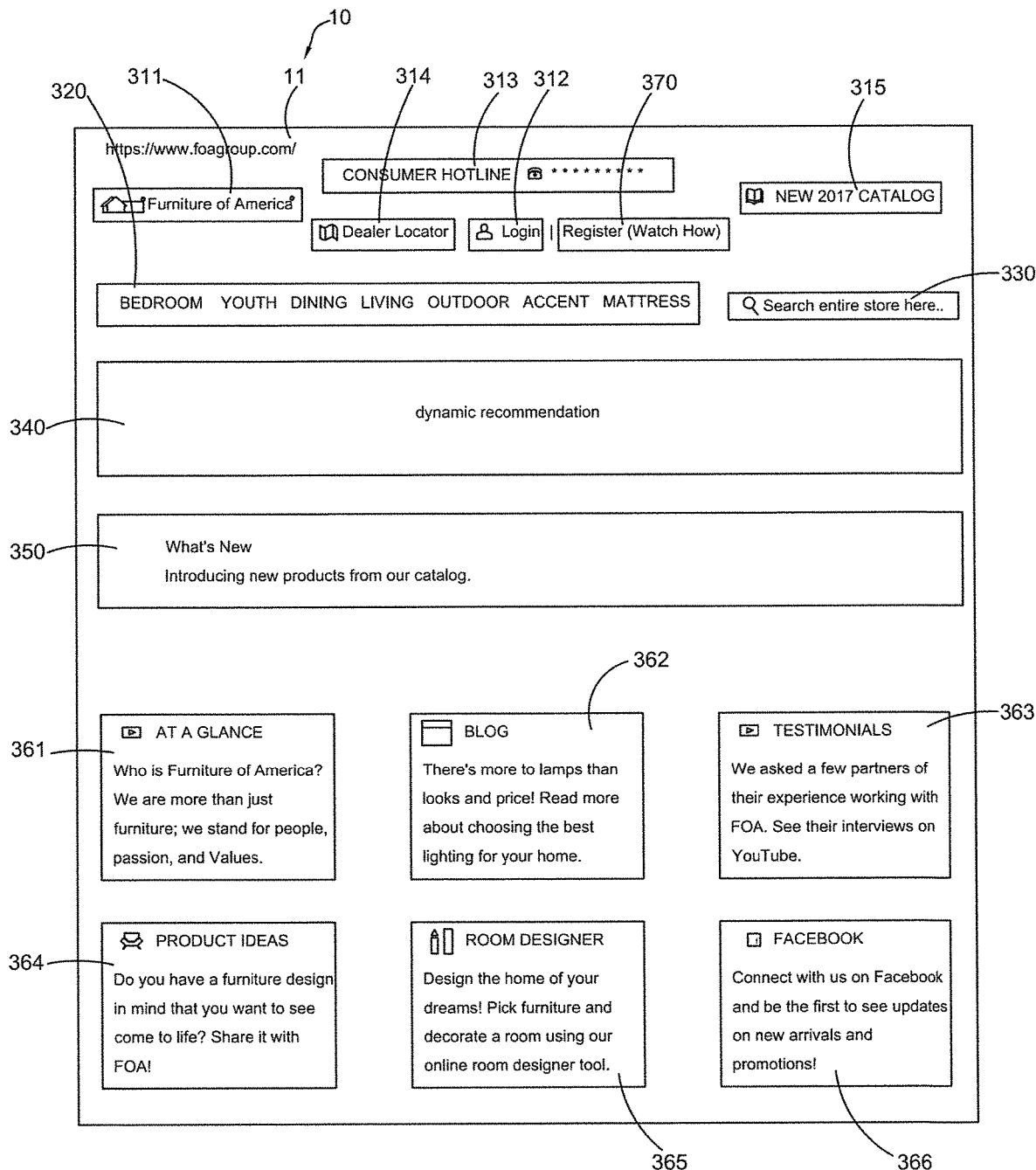
FIG. 1 to FIG. 4 illustrate Web pages of a templated website of a furniture ordering and marketing system according to an embodiment of the present invention.
Figure 2:
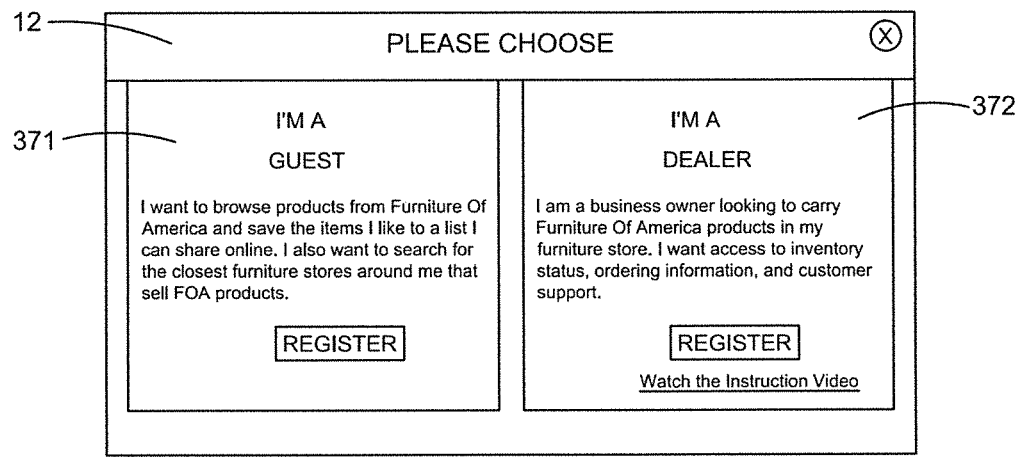

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 to FIG. 13 of the drawings, a furniture ordering and marketing system according to a preferred embodiment of the present invention is illustrated, wherein the furniture ordering and marketing system comprises a service system 200, a client system 100 and a communication module 900. The service system 200 and the client system 100 are communicated by the communication module 900.

The service system 200 provides information of furniture products which are stored in a warehouse via the Internet and sends Web pages of the furniture products information to the client system 100. A consumer or a distributor obtains the Web pages of the furniture products information displayed via the client system 100. The consumer or the distributor picks up purchased furniture and places orders via the client system 100. The client system 100 sends orders to the service system 200. The service system 200 processes the orders and the ordered furniture are shipped from the uniform warehouse.

The service system 200 provides a templated website 10 having Web pages and with a uniquely identifiable Uniform Resource Locator. The distributor uses the information and layout of the templated website 10 through the client system 100 and the templated website 10 is able to be converted into the distributor's website with its own logos. Moreover, the distributor's website is arranged to enable the distributor also to markup or reprice the retail prices of the furniture products shown in the distributor's website. In other words, the service system 200 processes the individual information of the distributor and the commodity price information on the templated website according to the distributor's request, and generates an individual website 20 having the individual information of the distributor and the changed commodity price information. The service system 200 sends changed Web pages of the individual website 20 to the client system 100. Furthermore, the distributor's consumers may select one or more purchased furniture and place orders with the distributor's retail prices via the client system 100. The placed orders of the distributor's consumers have the distributor's retail prices, the distributor's individual information such as logo and contacting address. However, the ordered furniture products are still shipped from the uniform warehouse, so that the distributor saves the furniture warehouse charges. On the other hand, if the distance of the uniform warehouse and the distributor's consumer is shorter than the distance of the distributor and the distributor's consumer, the transportation cost of the distributor's consumer also is reduced.

One skilled in the art should understand that the communication module 900 can be applied with the wire and/or wireless communication technology and the communication technology of the service system 200 and the client system 100 is exemplary only and not intended to be limiting.

Figure 13:
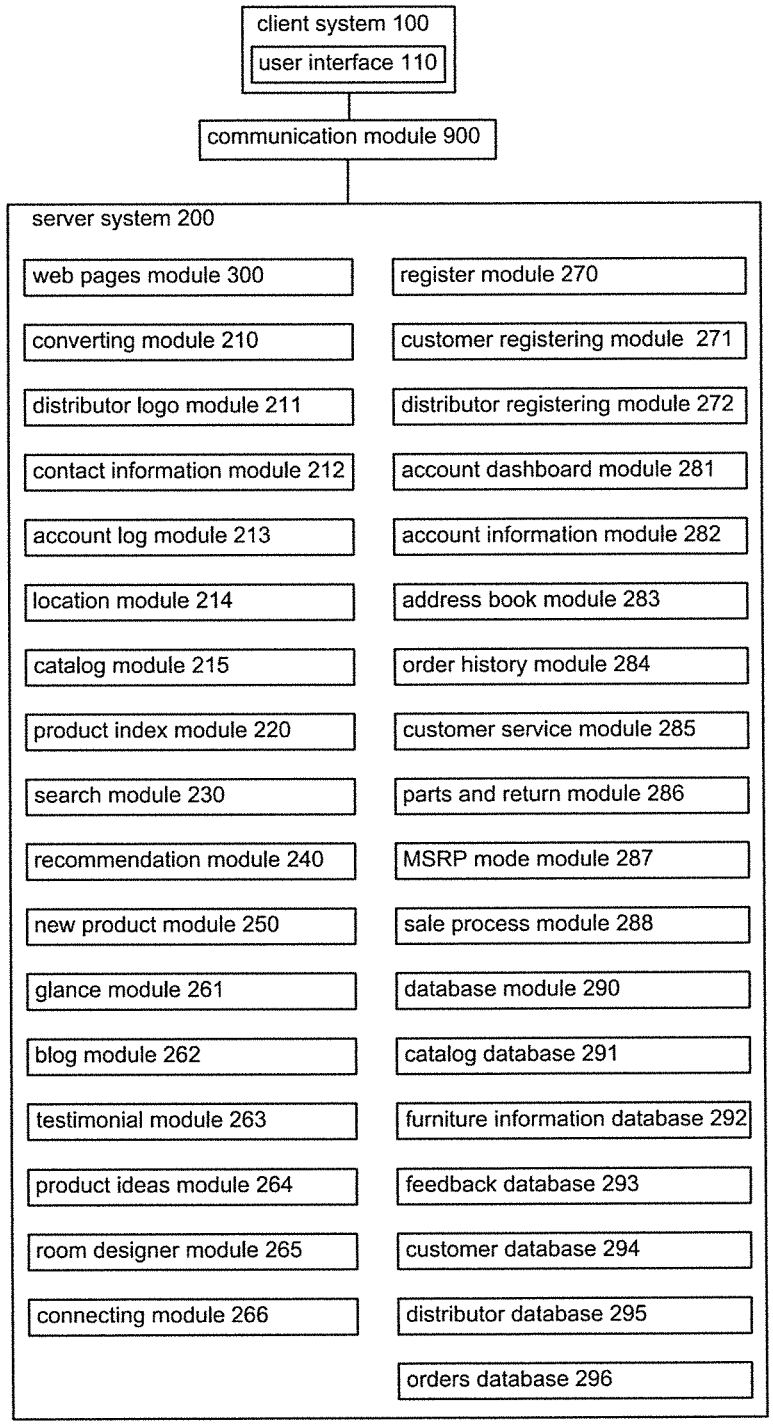
FIG. 13 is a block diagram of the furniture ordering and marketing system according to above embodiment of the present invention.

As shown in FIG. 1 and FIG. 13 of the drawings, a main Web page 11 of the templated website 10 is illustrated. The main Web page 11 has many web page sections which are identified by numbers. On one hand, when a user such as the consumer or the distributor selects such as embodied as clicking on some of the web page sections, a Web page presenting module 300 of the service system 200 processes the clicking action and new Web pages are presented; on the other hand, some of the web page sections just display information.

Specifically, a web page section 311 indicates logo information such as words "Furniture of America" and logo picture as shown in FIG. 1. A web page section 312 indicates contacting information of the owner of the templated website 10. A web page section 315 indicates furniture products catalog, when the user sends a request by clicking on the web page section 315, a catalog module 215 of the service system 200 retrieves the furniture products catalog data from a furniture products catalog 291 of a database module 290 of the service system 200 and sends to the Web page presenting module 300, the Web page presenting module 300 generates Web pages with furniture products catalog information, so that the user obtains the furniture products catalog via the client system 100. A web page section 314 indicates location information of the owner of the templated website 10. In response to a request by clicking on the web page section 314, a location module 214 acquires location information data and sends to the Web page presenting module 300. A web page section 320 indicates classified furniture products. The furniture products are classified as bedroom, youth, dining, living, outdoor, accent, mattress and so on. When the user sends a request by clicking on one kind of the classified furniture products on the web page section 320, a product index module 220 retrieves the requested furniture information from a furniture information database 292 of the service system 200 and sends to the Web page presenting module 300, the Web page presenting module 300 generates Web pages with detail furniture requested furniture information, so that the user obtains the requested furniture information such as price and stock information via the client system 100. A web page section 340 indicates dynamic recommendation of the furniture products, a recommendation module 240 of the service system 200 acquires salable furniture products information and sends to the Web page presenting module 300, and the Web page presenting module 300 generates Web pages with salable furniture products information in a dynamic online format. A web page section 350 indicates new furniture products information, a new product module 250 of the service system 200 acquires latest furniture products information and sends to the Web page presenting module 300, the Web page presenting module 300 generates Web pages with latest furniture products information.

A web page section 361 indicates enterprise spirit information, and a glance module 261 of the service system 200 acquires the enterprise spirit information data and sends to the Web page presenting module 300. A web page section 362 indicates detail product information, and a blog module 262 of the service system 200 acquires the detail product information data and sends to the Web page presenting module 300. A web page section 363 indicates testimonial video information, and a testimonial module 263 of the service system 200 acquires the testimonial video information data and sends to the Web page presenting module 300. A web page section 364 indicates product ideas sharing information. A product ideas module 264 of the service system 200 provides data entry fields for the user. When the user shares their ideas via the client system 100, the product ideas module 264 retrieves the user product ideas data and stores in a feedback database 293 of the database module 290. A web page section 365 indicates virtual furniture arrangement. A room designer module 265 acquires virtual furniture arrangement information data which are sent from the client system 100 and generates virtual furniture arrangement for user reference. A web page section 366 indicates connecting information such as Facebook links. The connecting module 266 provides the links.

A web page section 330 indicates search function and has a data entry field. When the user input searching information such as a chair in the data entry field of the web page section 330, a search module 230 retrieves the searching information data from the furniture information database 292 and sends to the Web page presenting module 300.

It is worth mentioning that the service system 200 comprises an account log module 213 for identifying a consumer and a dealer, and a register module 270 for generating an individual and unique ID for a user such as a consumer and a dealer.

Figure 3:
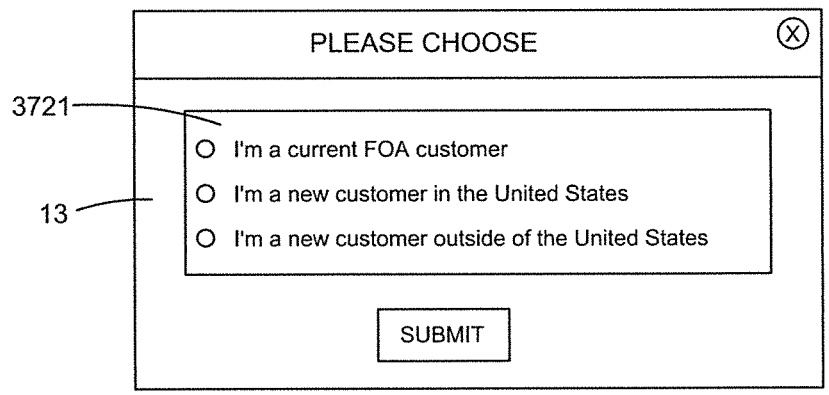

More specifically, as shown in FIG. 1 to FIG. 3 and FIG. 13 of the drawings, when a user sends a registering request by clicking on the web page section 370, the Web page presenting module 300 generates a Web page 12 as shown in FIG. 3 and the Web page 12 is displayed by the client system 100 for the user choosing account types. For example, two account types which are a customer account and a distributor account.

The customer account user is able to browse furniture products from the templated website 10 and save the items to a list, and is also able to search for the closest furniture stores around that sell products on the templated website 10. When the user chooses to register as the customer account and sends a request by clicking on a web page section 371, the Web page presenting module 300 generates web pages with data entry fields for the user filling individual information data such as name, passwords and address. A customer registering module 271 of the register module 270 acquires the customer individual information data and configures unique customer ID for the user. Meanwhile, the customer registering module 271 pairs the individual information data with the customer ID data and sends to a customer database 294 of the database module 290. The customer database 294 stores the paired individual information data with the customer ID data.

The distributor account user is a business owner who is able to carry the furniture products on the templated website 10 in his own furniture store. The distributor account user is also able to access to inventory status, ordering information, and customer support. When the user chooses to register as the customer account and sends a request by clicking on a web page section 372, the Web page presenting module 300 generates web pages with data entry fields for the user filling individual information data such as name, passwords and address. A distributor registering module 272 of the register module 270 acquires the distributor individual information data and configures unique distributor ID for the user. Meanwhile, the distributor registering module 272 pairs the distributor individual information data with the distributor ID data and sends to a distributor database 295 of the database module 290. The distributor database 295 stores the paired distributor individual information data with the distributor ID data.

It is worth mentioning that during the distributor account registering process, according to three different circumstances, the filled individual information data are different and the distributor individual information data which processed by the distributor registering module 272 are different. As shown in FIG. 3 and FIG. 13 of the drawings, a Web page 13 of the templated website 10 is illustrated. A web page section 3721 indicates three choices for the registering user. The registering user chooses one of the three choices. If the registering user is already a current customer of the templated website 10 having a customer ID and wants to convert account type from a customer account user into a distributor account user, the Web pages generated by the Web page presenting module 300 have less data entry fields than a normal one who is a new customer in this country. Moreover, providing the customer ID will accelerate the account setup process of the distributor account. If the user is outside of this country, additional individual information is needed to be filled such as three trade companies' information. The Web page presenting module 300 generates different register Web pages according different choices of the registering user.

Figure 4:
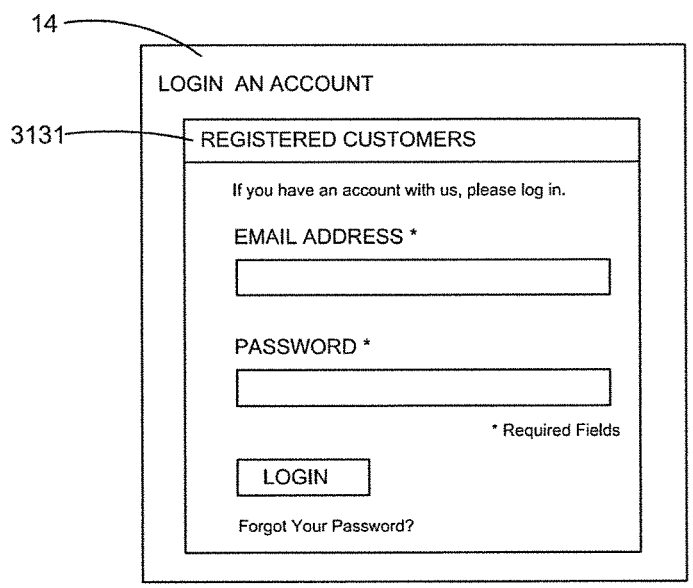

As shown in FIG. 4 and FIG. 13 of the drawings, a Web page 14 of the templated website 10 is illustrated. A web page section 3131 on the Web page 14 indicates login information. When a registered user sends a request by clocking on the web page section 313 on the Web page 11 as shown in FIG. 1, the Web page presenting module 300 generates the Web page 14 of the templated website 10 for the registered user to log. When the registered user fills the customer ID or the distributor ID on the data entry fields of the web page 3131, the account log module 213 identifies the registered user information. If the filled customer ID data maps with the stored customer ID data in the customer database 294, the registered user is access to log as a consumer account user. If the filled distributor ID data maps with the stored distributor ID data in the distributor database 295, the registered user is access to log as a distributor account user.

It is worth mentioning that distributor account user is able to access to inventory status, ordering information, and customer support. The distributor account user uses the information and layout of the templated website 10 through the client system 100. When the templated website 10 is in a distributor account user state, the service system 200 converts the templated website 10 into the distributor's individual website with its own logos. Moreover, the distributor account user also is able to markup or reprice the retail prices of the furniture products shown in the distributor's website. In other words, the service system 200 processes the individual information of the distributor and the commodity price information on the templated website 10 according to the distributor's request, and generates the individual website 20 having the individual information of the distributor account user and the changed commodity price information.

As shown in FIG. 5 to FIG. 12 of the drawings, the individual website 20 having a plurality of Web pages generated by the service system 200 and displayed by the client system is illustrated.

Figure 5:
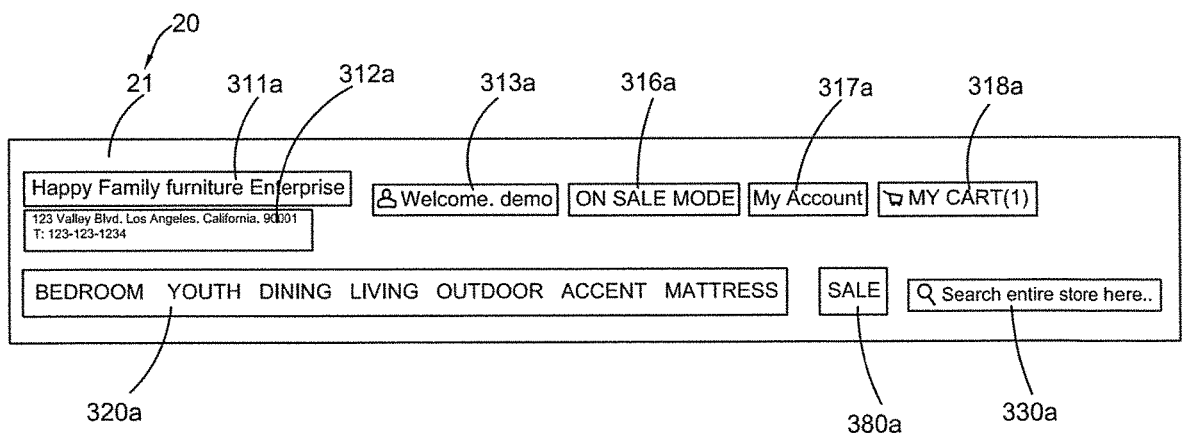

More specifically, as shown in FIG. 5 and FIG. 13 of the drawings, when a distributor logs the templated website 10, the service system 200 converts the templated website 10 into the individual website 20. Compared with the templated website 10 as shown in FIG. 1 of the drawings, the web page section 311 is converted into a web page section 311a by a distributor logo module 211 of the service system 200. The web page section 311a indicates distributor logo information. Compared with the templated website 10 as shown in FIG. 1 of the drawings, the web page section 312 is converted into a web page section 312a by a contact information module 212 of the service system 200. The web page section 312a indicates distributor address and contacting information. Compared with the templated website 10 as shown in FIG. 1 of the drawings, the web page section 313 is converted into a web page section 313a by a converting module 210 of the service system 200. The web page section 313a indicates the login state of the distributor.

Similarly, a web page section 320a of the Web page 21 indicates classified furniture products. The furniture products are classified as bedroom, youth, dining, living, outdoor, accent, mattress and so on. A web page section 330a indicates search function and has a data entry field. When the distributor or the consumer input searching information such as a bed in the data entry field of the web page section 330a, a search module 230a retrieves the searching information data from the furniture information database 292 and sends to the Web page presenting module 300. A web page section 318a indicates the shopping cart status.

It is worth mentioning that a web page section 316a indicates the individual website 20 is on sale mode so as to differ from the normal templated website 10.

It is worth mentioning that a web page section 380a indicates a sale catalog. When the user sends a request by clicking on the web page section 380a, a sale process module 288 of the service system 200 retrieves sale catalog data from the furniture information database 292 and sends to the Web page presenting module 300.

Figures 8, 9:
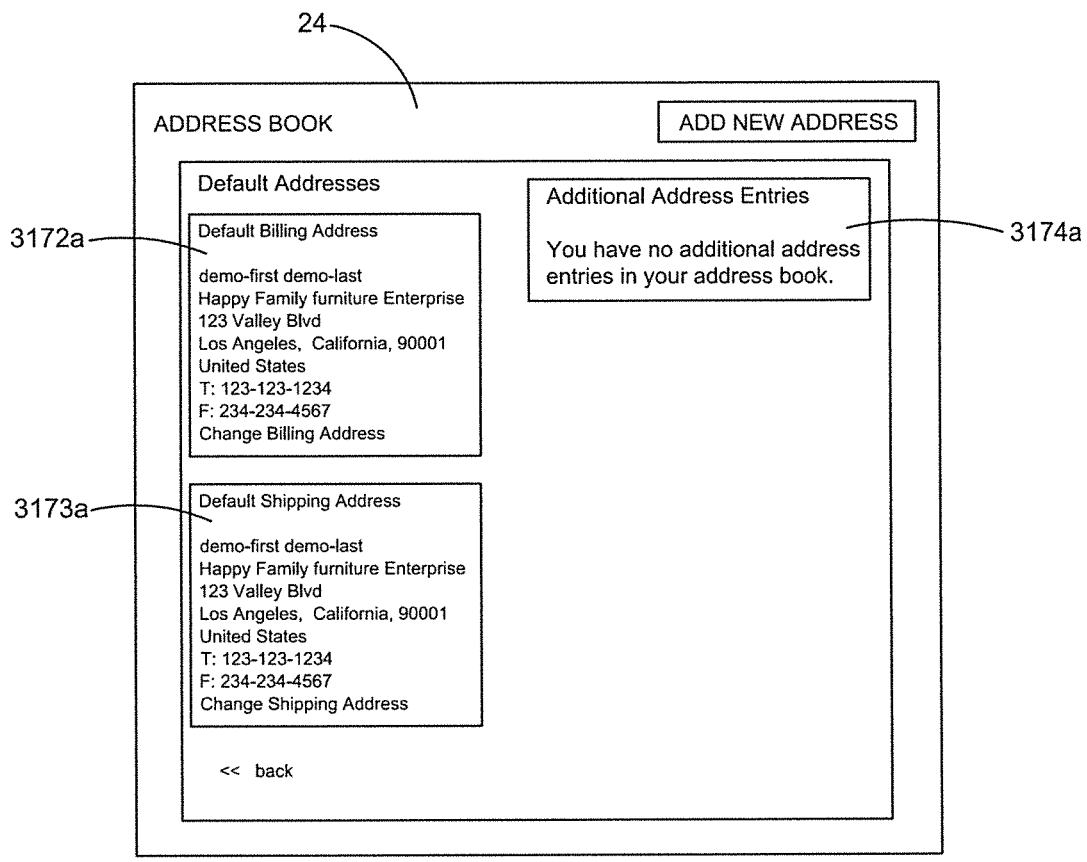

It is worth mentioning that a web page section 317a indicates account management request information. When a user sends an account management request by clicking on the web page section 317a, the Web page presenting module 300 generates Web pages 22 to 28 as shown in FIG. 6 to FIG. 12 of the drawings. More specifically, as shown in FIG. 6 and FIG. 13 of the drawings, a web page section 3171a indicates recent orders of the current login account. In response a request, an account dashboard module 281 of the service system 200 retrieves recent orders data from the orders database 296 and sends to the Web page presenting module 300, so that the user is able to view a snapshot of the recent account activity and updates the account information. As shown in FIG. 7 and FIG. 13 of the drawings, the Web page 23 generated by the Web page presenting module 300 indicates account information and the account information such as name and address are able to be edited. When the user refreshes account information into the data entry fields of the Web page 23 by a user interface 110 of the client system 100, an account information module 282 of the service system 200 acquires the refreshed account information data and sends to the distributor database 295 and the customer database 294 according to the account type. As shown in FIG. 8 and FIG. 13 of the drawings, the Web page 24 generated by the Web page presenting module 300 indicates address book information. A web page section 3172a indicates default billing address information, a web page section 3173a indicates default shipping address information and a web page section 3173a indicates additional address entries information. When the user refreshes address information into the data entry fields of the Web page 24 by the user interface 110 of the client system 100, an address book module 283 acquires the refreshed address information data and sends to the distributor database 295 and the customer database 294 according to the account type. As shown in FIG. 9 and FIG. 13 of the drawings, the Web page 25 generated by the Web page presenting module 300 indicates sales history information. In response to a request, an order history module 284 retrieves required sales history information from the orders database 296 and sends to the Web page presenting module 300. As shown in FIG. 10 and FIG. 13 of the drawings, the distributor account user is able to access to customer support. The Web page 26 generated by the Web page presenting module 300 indicates customer service form information for the distributor such as general inquiry or feedback, payment, and shipping/delivery inquiry. In response to a request, a customer service module 285 of the service system 200 processes the customer service form information data. As shown in FIG. 11 and FIG. 13 of the drawings, the distributor account user is able to access to customer support on parts/return. The Web page 27 generated by the Web page presenting module 300 indicates the parts/return form information and a parts and return module 286 of the service system 200 processes the parts/return form information data.

It is worth mentioning that for the distributor account user, the individual website 20 provides a MSRP (Manufacturer Suggested Retail Price) mode for the distributor, so that the distributor has access to mark up or reprice the retail prices of the products shown in the individual website 20. As shown in FIG. 12 and FIG. 13 of the drawings, the Web page 28 generated by the Web page presenting module 300 indicates the MSRP mode information. A web page section 3175a indicates enable MSRP information to remind the users of the risks. A web page section 3176a indicates the choices of showing in-stock items only or not. A web page section 3177a indicates the markup rates for the distributor to decide. A MSRP mode module 287 of the service system 200 processes the retail prices data of the furniture products. For example, if the distributor chooses the 100% rate, the MSRP mode module 287 configures pricing data of the furniture products, so that the displayed prices contain double profits. The displayed furniture products price shown on the individual website 20 for the distributor's customer is higher than the displayed furniture products price shown on the templated website 10.

In other words, the MSRP option is designed to help increase sales at distributor's store. The distributor can use any device such as a desktop computer, laptop, tablet or kiosk to use this option. By checking on "ENABLE MSRP" indicated in the web page section 3175a and selecting a markup indicated in the web page section 3177a, the MSRP pricing will be shown instead of the distributor's cost. This will allow the distributor's customers to add products to the shopping cart. The distributor can then review the order and print the screen to use as sales confirmation. When the distributor's customers are done selecting products, the distributor can proceed to checkout and place the order right away. All prices will be automatically adjusted back to the distributor's dealer cost as shown in the templated website 10 on the distributor's order.

It is worth mentioning that in the MSRP mode, when the distributor repriced the furniture products on the individual website 20, the prices on the sale catalog are also repriced.

Referring to FIG. 14 to FIG. 20 of the drawings, a furniture ordering and marketing method according to an embodiment is illustrated.

Figure 14:
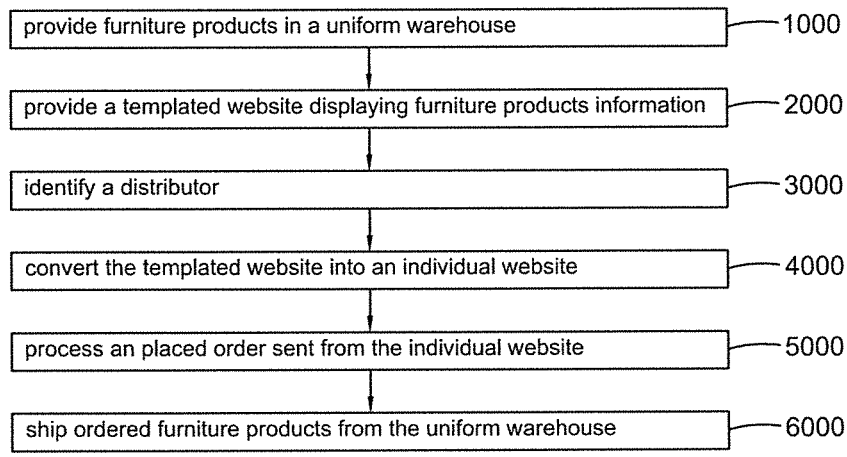
FIG. 14 is a flow diagram of a furniture ordering and marketing method according to an embodiment of the present invention.

Specifically, as shown in FIG. 14 of the drawings, the furniture ordering and marketing method comprises the following steps:

(1000) Provide furniture products in a uniform warehouse.

(2000) Provide a templated website displaying furniture products information.

(3000) Identify a distributor.

(4000) Convert the templated website into an individual website.

(5000) Process a placed order sent from the individual website.

(6000) Ship ordered furniture products from the uniform warehouse.

Figure 15:
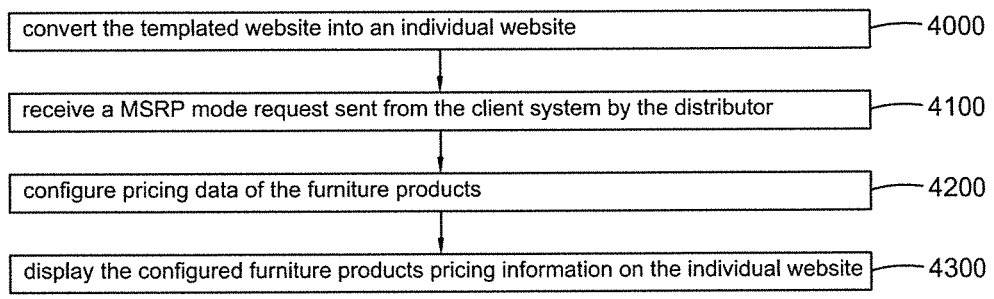
FIG. 15 is a flow diagram of the furniture ordering and marketing method according to above embodiment of the present invention.

As shown in FIG. 15 of the drawings, the furniture ordering and marketing method comprises the following steps:

(4000) Convert the templated website into an individual website.

(4100) Receive a MSRP mode request sent from the client system by the distributor.

(4200) Configure pricing data of the furniture products.

(4300) Display the configured furniture products pricing information on the individual website.

Figure 16:
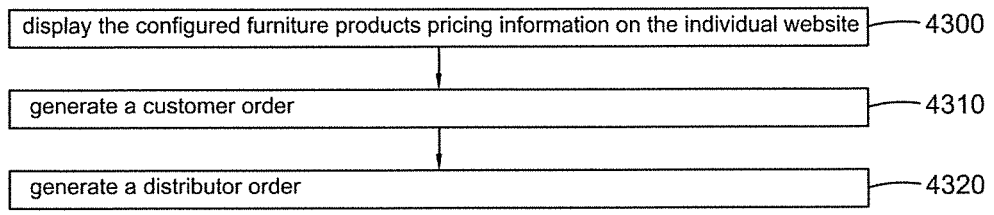
FIG. 16 is a flow diagram of the furniture ordering and marketing method according to above embodiment of the present invention.

As shown in FIG. 16 of the drawings, the furniture ordering and marketing method comprises the following steps:

(4300) Display the configured furniture products pricing information on the individual website.

(4310) Generate a customer order.

(4320) Generate a distributor order.

Figure 17:
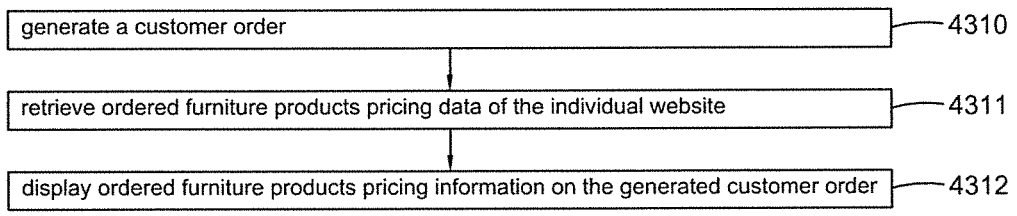
FIG. 17 is a flow diagram of the furniture ordering and marketing method according to above embodiment of the present invention.

As shown in FIG. 17 of the drawings, the furniture ordering and marketing method comprises the following steps:

(4310) Generate a customer order.

(4311) Retrieve ordered furniture products pricing data of the individual website.

(4322) Display ordered furniture products pricing information on the generated customer order.

Figure 18:
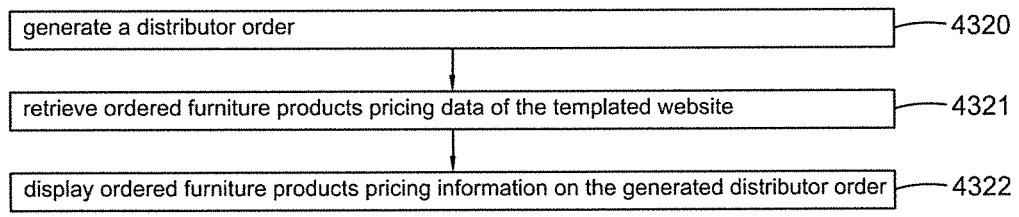
FIG. 18 is a flow diagram of the furniture ordering and marketing method according to above embodiment of the present invention.

As shown in FIG. 18 of the drawings, the furniture ordering and marketing method comprises the following steps:

(4320) Generate a distributor order.

(4321) Retrieve ordered furniture products pricing data of the templated website.

(4322) Display ordered furniture products pricing information on the generated distributor order.

Figure 19:
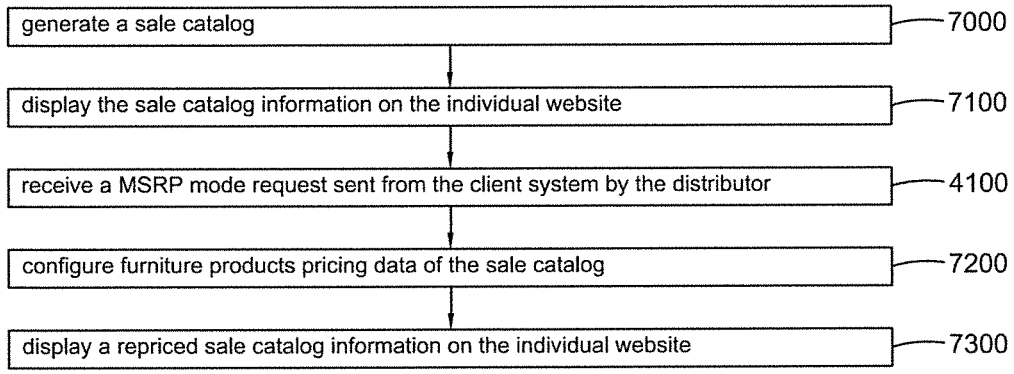
FIG. 19 is a flow diagram of the furniture ordering and marketing method according to above embodiment of the present invention.

As shown in FIG. 19 of the drawings, the furniture ordering and marketing method comprises the following steps:

(7000) Generate a sale catalog.

(7100) Display the sale catalog information on the individual website.

(4100) Receive a MSRP mode request sent from the client system by the distributor.

(7200) Configure furniture products pricing data of the sale catalog.

(7300) Display a repriced sale catalog information on the individual website.

Figure 20:
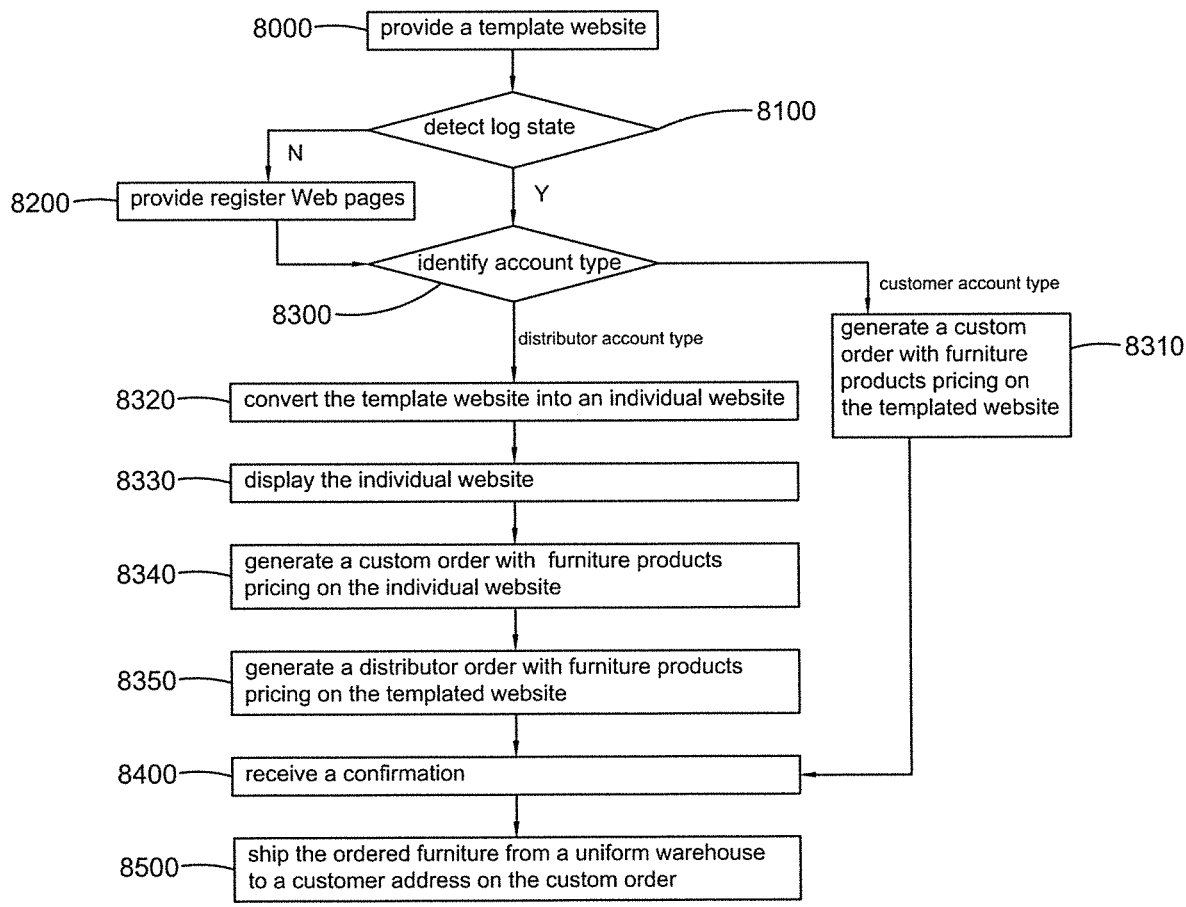
FIG. 20 is a flow diagram of the furniture ordering and marketing method according to above embodiment of the present invention.

As shown in FIG. 20 of the drawings, the furniture ordering and marketing method comprises the following steps:

(8000) Provide a template website by the service system 200;

(8100) Detect log state by the service system 200.

(8200) When the user of the template website is not in a login state, provide register Web pages by the service system 200 for the user to log in.

(8300) When the user of the template website is in a login state, identify the account type of the user by the service system 200.

(8310) When the account type is a customer account type, generate a custom order with furniture products pricing on the templated website by the service system 200.

(8400) Receive a confirmation from the customer account by the service system 200.

(8500) Ship the ordered furniture from a uniform warehouse to a customer address on the custom order.

In the step (8300), when the account type is a distributor account type, the method further comprises the following steps:

(8320) Convert the template website into an individual website by the service system 200.

(8330) Display the individual website for the distributor by the client system 100.

(8340) Generate a custom order with furniture products pricing on the individual website by the service system 200.

(8350) Generate a distributor order with furniture products pricing on the templated website by the service system 200.

(8400) Receive a confirmation from the distributor by the service system 200.

(8500) Ship the ordered furniture from a uniform warehouse to a customer address on the custom order.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A furniture ordering and marketing system, comprising a plurality of furniture products, a computer of a service system and a computer of a client system communicatingly connected with said service system through Internet, wherein the service system supplies the furniture products stored in a warehouse and a templated website containing information of the furniture products and having a plurality of web page sections being customized, wherein the service system sends Web pages of the furniture products information to the client system, wherein the service system identifies a distributor in response to a log request from a distributor via the computer of the client system, wherein the service system comprises a converting module which converts the templated website into an individual website having individual information and the information of furniture products after the templated website is customized, wherein the service system processes a placed order sent from the individual website.

2. The furniture ordering and marketing system, as recited in claim 1, wherein the service system comprises a Web page presenting module generating Web pages in response to requests sent from the client system.

3. The furniture ordering and marketing system, as recited in claim 1, wherein the converting module adds a distributor's logo information on the individual website.

4. The furniture ordering and marketing system, as recited in claim 1, wherein the service system comprises a furniture information database and a sale process module retrieving sale catalog data from the furniture information database, wherein the service system further comprises a Web page presenting module generating Web pages in response to requests sent from the client system.

5. The furniture ordering and marketing system, as recited in claim 1, wherein the service system comprises an orders database and an order history module retrieving sales history information from the orders database.

6. The furniture ordering and marketing system, as recited in claim 1, wherein the service system comprises a MSRP mode module configuring pricing data of the furniture products in response to a MSRP mode request sent from the client system by a distributor, so that retail prices of the furniture products displaying in the individual website are able to be repriced by the distributor.

7. The furniture ordering and marketing system, as recited in claim 6, wherein the service system comprises a Web page presenting module generating Web pages displaying the configured furniture products pricing data on the individual website.

8. The furniture ordering and marketing system, as recited in claim 7, wherein the service system comprises an account log module identifying a consumer account and a distributor account.

9. The furniture ordering and marketing system, as recited in claim 1, wherein the service system comprises an account log module identifying a consumer account and a distributor account.

10. The furniture ordering and marketing system, as recited in claim 9, wherein the service system comprises a register module generating a unique customer ID for the consumer account and generating a unique distributor ID for the distributor account.

11. The furniture ordering and marketing system, as recited in claim 9, wherein the service system comprises a location module acquiring location information of the distributor account.

12. The furniture ordering and marketing system, as recited in claim 1, wherein the service system comprises a furniture products catalog, and a catalog module retrieving furniture products catalog data from the furniture products catalog, wherein the service system further comprises a Web page presenting module generating Web pages with furniture products catalog information.

13. A furniture ordering and marketing method via a furniture ordering and marketing system, wherein the furniture ordering and marketing system comprises a computer of a service system, a computer of a client system, and a plurality of furniture products stored in a warehouse of the service system, wherein the furniture ordering and marketing method comprises the steps of:
   (a) via the computer of the service system, providing a templated website displaying of furniture products information, and a plurality of web page sections being customized;
   (b) identifying a distributor in response to a log request from the distributor via the computer of the client system;
   (c) via the computer of the service system, converting the templated website into an individual website with the distributor's individual information, wherein the individual website contains the furniture products information and the distributor's individual information after the templated website is customized; and
   (d) via the computer of the service system, processing a placed order sent from the individual website.

14. The furniture ordering and marketing method, as recited in claim 13, wherein the step (c) further comprises the steps of:
   (c1) under control of the computer of the service system, receiving a MSRP mode request sent from the client system by the distributor;
   (c2) configuring pricing data of the furniture products in response to a markup action of the distributor via the computer of the client system; and
   (c3) displaying the configured furniture products pricing data on the individual website.

15. The furniture ordering and marketing method, as recited in claim 14, wherein the step (c3) further comprises the steps of:
   (c31) generating a customer order in response to a sale confirming request sent by a customer from the computer of the client system; and
   (c32) generating a distributor order in response to a checkout request sent by the distributor from the computer of the client system.

16. The furniture ordering and marketing method, as recited in claim 15, wherein the step (c31) further comprises the steps of:
(c311) retrieving ordered furniture products pricing data of the individual website; and
(c312) displaying ordered furniture products pricing information on the generated customer order.

17. The furniture ordering and marketing method, as recited in claim 15, wherein the step (c32) further comprises the steps of:
(c321) retrieving ordered furniture products pricing data of the templated website; and
(c322) displaying ordered furniture products pricing information on the generated distributor order.

18. The furniture ordering and marketing method, as recited in claim 14, further comprising a step of generating a sale catalog via the computer of the service system.

19. The furniture ordering and marketing method, as recited in claim 18, further comprising a step of displaying information from the sale catalog on the individual website.

20. The furniture ordering and marketing method, as recited in claim 19, wherein the step (c1) further comprises the steps of: configuring furniture products pricing data of the sale catalog by the computer of the service system; and
displaying repriced sale catalog information on the individual website.

21. The furniture ordering and marketing method, as recited in claim 14, wherein the step (c1) further comprises the steps of: configuring furniture products pricing data of a sale catalog by the computer of the service system; and
displaying repriced sale catalog information on the individual website.

22. The furniture ordering and marketing method, as recited in claim 13, further comprising a step of generating a sale catalog via the computer of the service system.

23. The furniture ordering and marketing method, as recited in claim 15, further comprising a step of displaying information from the sale catalog on the individual website.

24. The furniture ordering and marketing method, as recited in claim 23, further comprising the steps of: receiving a MSRP mode request sent from the computer of the client system by the distributor; configuring furniture products pricing data of the sale catalog by the computer of the service system; and displaying repriced sale catalog information on the individual website.

25. The furniture ordering and marketing method, as recited in claim 13, wherein the step (a) further comprises a step of, under control of the computer of the service system, detecting a login state.

26. The furniture ordering and marketing method, as recited in claim 25, further comprising a step of, when a user of the template website is not in the login state, providing register Web pages.

27. The furniture ordering and marketing method, as recited in claim 25, further comprising a step of, when a user of the template website is in the login state, identifying the account type of the user.

28. The furniture ordering and marketing method, as recited in claim 27, further comprising a step of, when the account type is a customer account type, generating a custom order with furniture products pricing on the templated website by the computer of the service system.

29. The furniture ordering and marketing method, as recited in claim 28, further comprising a step of receiving a confirmation from the customer account by the computer of the service system.

30. The furniture ordering and marketing method, as recited in claim 29, further comprising a step of shipping the ordered furniture from the warehouse to a customer address on the custom order.

31. The furniture ordering and marketing method, as recited in claim 27, further comprising a step of, when the account type is a distributor account type, converting the template website into an individual website by the computer of the service system.

32. The furniture ordering and marketing method, as recited in claim 31, further comprising a step of, under control of the computer of the client system, displaying the individual website for the distributor.

33. The furniture ordering and marketing method, as recited in claim 32, further comprising a step of, under control of the computer of the service system, generating a custom order with furniture products pricing on the individual website.

34. The furniture ordering and marketing method, as recited in claim 33, further comprising a step of generating a distributor order with furniture products pricing on the templated website by the computer of the service system.

35. The furniture ordering and marketing method, as recited in claim 34, further comprising a step of receiving a confirmation from the distributor by the computer of the service system.

36. The furniture ordering and marketing method, as recited in claim 35, further comprising a step of shipping the ordered furniture from the warehouse to a customer address on the custom order.

\* \* \* \* \*